(12) United States Patent
Lu

(10) Patent No.: US 8,579,575 B2
(45) Date of Patent: Nov. 12, 2013

(54) WIND TURBINE

(76) Inventor: Shun-Tsung Lu, Wufong Hsiang (TW)

( * ) Notice: Subject to any disclaimer, the term of this patent is extended or adjusted under 35 U.S.C. 154(b) by 737 days.

(21) Appl. No.: 12/814,562

(22) Filed: Jun. 14, 2010

(65) Prior Publication Data

US 2011/0305557 A1 Dec. 15, 2011

(51) Int. Cl.
*F04D 31/00* (2006.01)

(52) U.S. Cl.
USPC ............. 415/4.1; 415/4.3; 415/143; 416/175; 416/187; 416/197 A; 416/198 R; 416/203

(58) Field of Classification Search
USPC ............. 415/2.1, 4.1, 4.3, 4.5, 143; 416/175, 416/187, 198 R, 197 R, 197 A, 200 A, 201 R, 416/198 A, 203
See application file for complete search history.

(56) References Cited

U.S. PATENT DOCUMENTS

| 3,942,026 A * | 3/1976 | Carter | 416/9 |
| 4,213,057 A * | 7/1980 | Are | 416/11 |
| 8,297,052 B2 * | 10/2012 | Lu | 290/54 |

* cited by examiner

*Primary Examiner* — Igor Kershteyn
(74) *Attorney, Agent, or Firm* — Bacon & Thomas, PLLC

(57) ABSTRACT

A wind turbine has a spindle, a first fan device and a second fan device. The first fan device is rotatably mounted around the spindle and has a first pivot hole and at least two first blades. The first pivot hole is formed through a center of the first fan device and is mounted around the spindle. The at least two first blades are radially mounted on and protrude from an external surface of the first fan device. The second fan device is rotatably mounted around the spindle, abuts with the first fan device and has a second pivot hole and at least two second blades. The second pivot hole is formed through a center of the second fan device and is mounted around the spindle. The at least two second blades are mounted on and protrude from an external surface of the second fan device.

12 Claims, 11 Drawing Sheets

WIND TURBINE

BACKGROUND OF THE INVENTION

1. Field of the Invention

The present invention relates to a wind turbine, and more particularly to a wind turbine capable of rotation in calm gentle wind conditions.

2. Description of Related Art

Due to various environmental, political and economic forces developing sustainable energy sources has become of paramount importance.

Sustainable energy includes solar, wind and water. Wind is harnessed to drive blades of a conventional wind turbine to generate electric power. However, wind is not stable and is depended on weather and since conventional wind turbines have specific dimensions, they can not generate power in calm wind conditions.

The wind turbine in accordance with the present invention mitigates or obviates the aforementioned problems.

SUMMARY OF THE INVENTION

The main objective of the present invention is to provide a wind turbine capable of rotation in calm wind conditions.

The wind turbine in accordance with the present invention has a spindle, a first fan device and a second fan device. The first fan device is rotatably mounted around the spindle and has a first pivot hole and at least two first blades. The first pivot hole is formed through a center of the first fan device and is mounted around the spindle. The at least two first blades are radially mounted on and protrude from an external surface of the first fan device. The second fan device is rotatably mounted around the spindle, abuts with the first fan device and has a second pivot hole and at least two second blades. The second pivot hole is formed through a center of the second fan device and is mounted around the spindle. The at least two second blades are mounted on and protrude from an external surface of the second fan device. The wind turbine in accordance with the present invention can be used to generate electric power in all conditions of the wind power.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
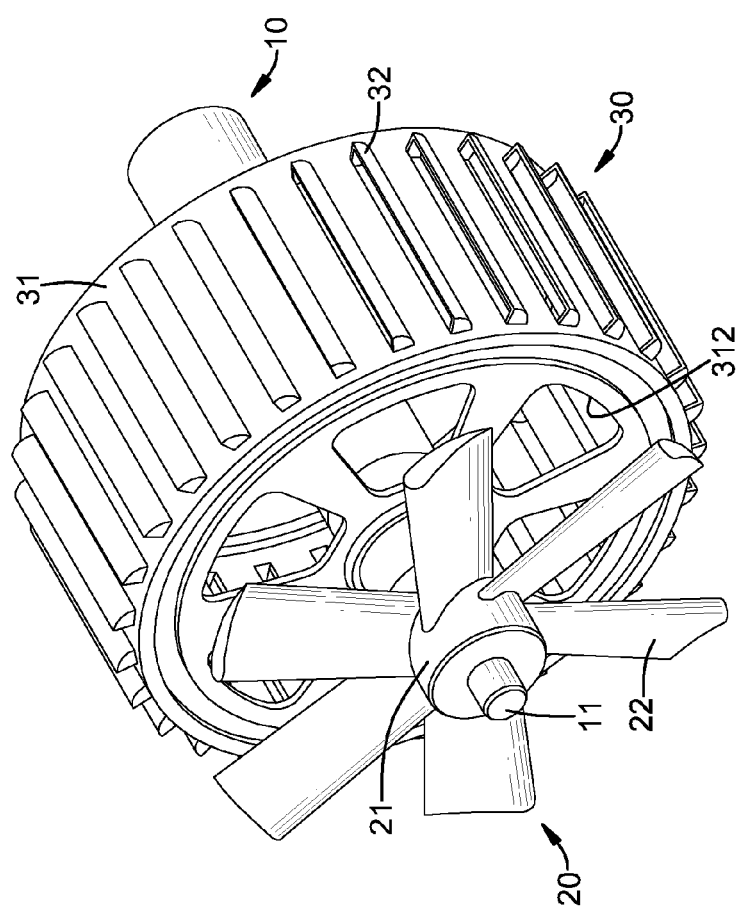
FIG. 1 is a perspective view of a first embodiment of a wind turbine in accordance with the present invention.
Figure 2:
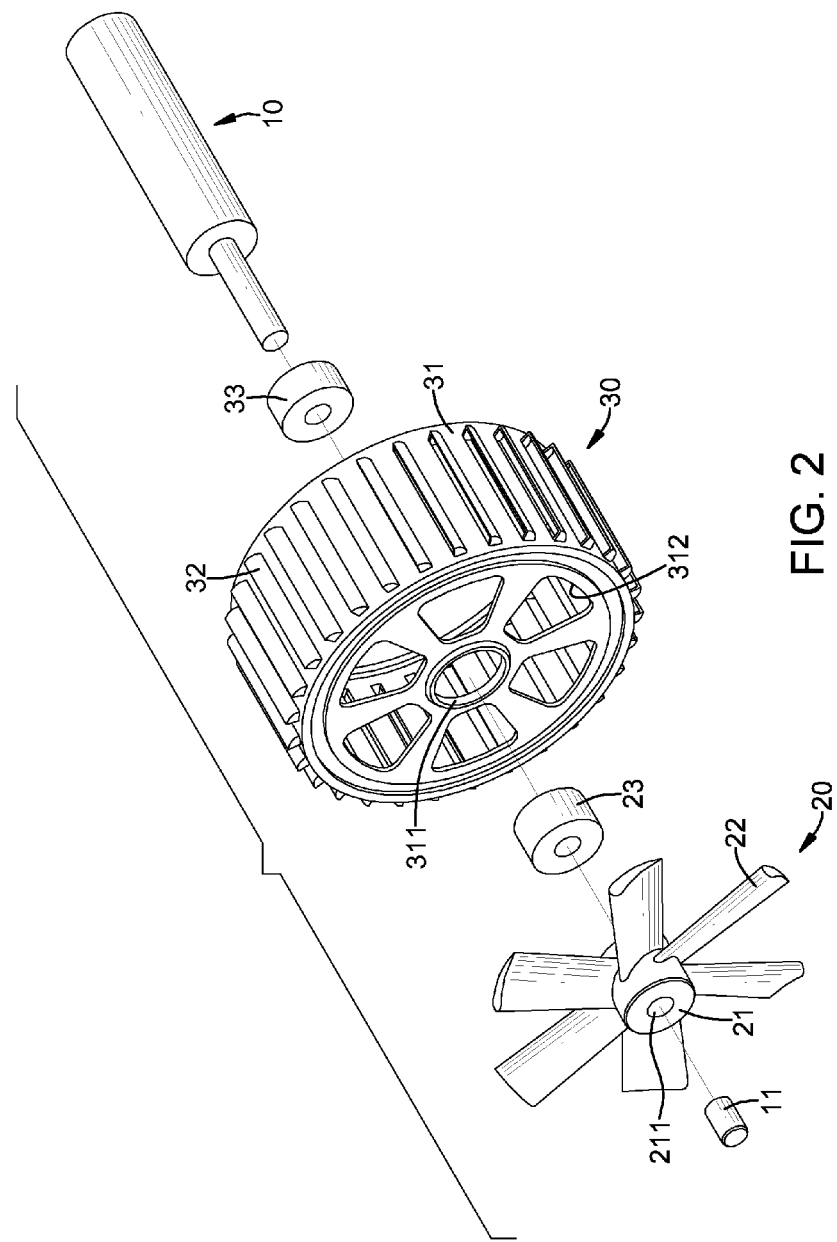
FIG. 2 is an exploded perspective view of the wind turbine in FIG. 1.

With reference to FIGS. 1 and 2, a first embodiment of a wind turbine in accordance with the present invention comprises a spindle 10, a first fan device 20 and a second fan device 30.

Figure 3:
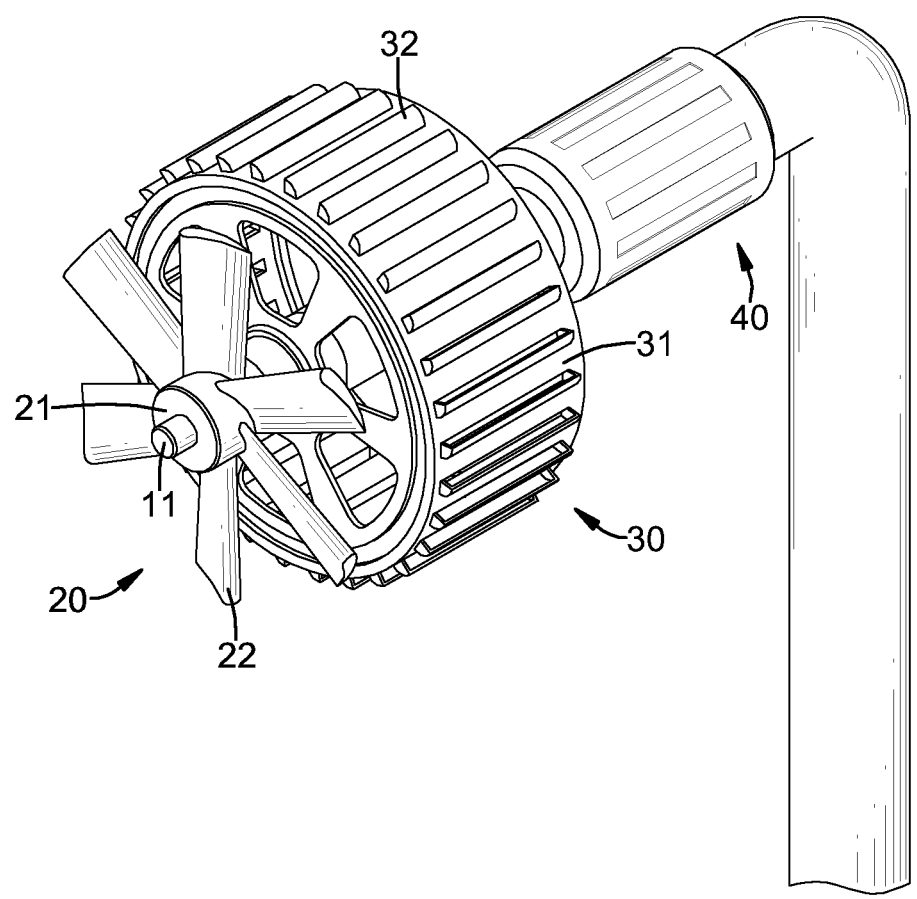
FIG. 3 is another perspective view of the wind turbine in FIG. 1 connected to a generator.

With further reference to FIG. 3, the spindle 10 may be connected to a generator 40 and has a rear end, a front end and a limiting cover 11. The rear end of the spindle 10 is connected to the generator 40. The limiting cover 11 is securely mounted around the front end of the spindle 10.

The first fan device 20 is rotatably mounted around the spindle 10 near the front end and has a body 21, at least two first blades 22 and an insulating ring 23. The body 21 is mounted around the spindle 10 near the front end, holds on the spindle 10 by the limiting cover 11 and has a center, an external surface and a first pivot hole 211. The first pivot hole 211 is formed through the center of the body 21 and is mounted around the spindle 10 near the front end. The at least two first blades 22 are radially mounted on and protrude from the external surface of the body 21. Preferably, with further reference to FIGS. 1, 8, 9 and 10, the first fan device 20 may has six, three, four or five first blades 22 radially mounted on and protruded from the external surface of the body 21 at intervals. The insulating ring 23 is mounted around the spindle 10 and abuts with the body 21.

The second fan device 30 is rotatably mounted around the spindle 10 and has a casing 31, at least two second blades 32 and a holding ring 33. The casing 31 is mounted around the spindle 10 near the body 21 of the first fan device 20, is separated from the first fan device 20 by the insulating ring 23 and has a front side, an external surface, a second pivot hole 311 and multiple through holes 312. The front side of the casing 31 has a center. The second pivot hole 311 is formed through the center of the front side of the casing 31 and is mounted around the spindle 10. The through holes 312 are formed through the front side of the casing 31 around the second pivot hole 311 at intervals.

Figure 11:
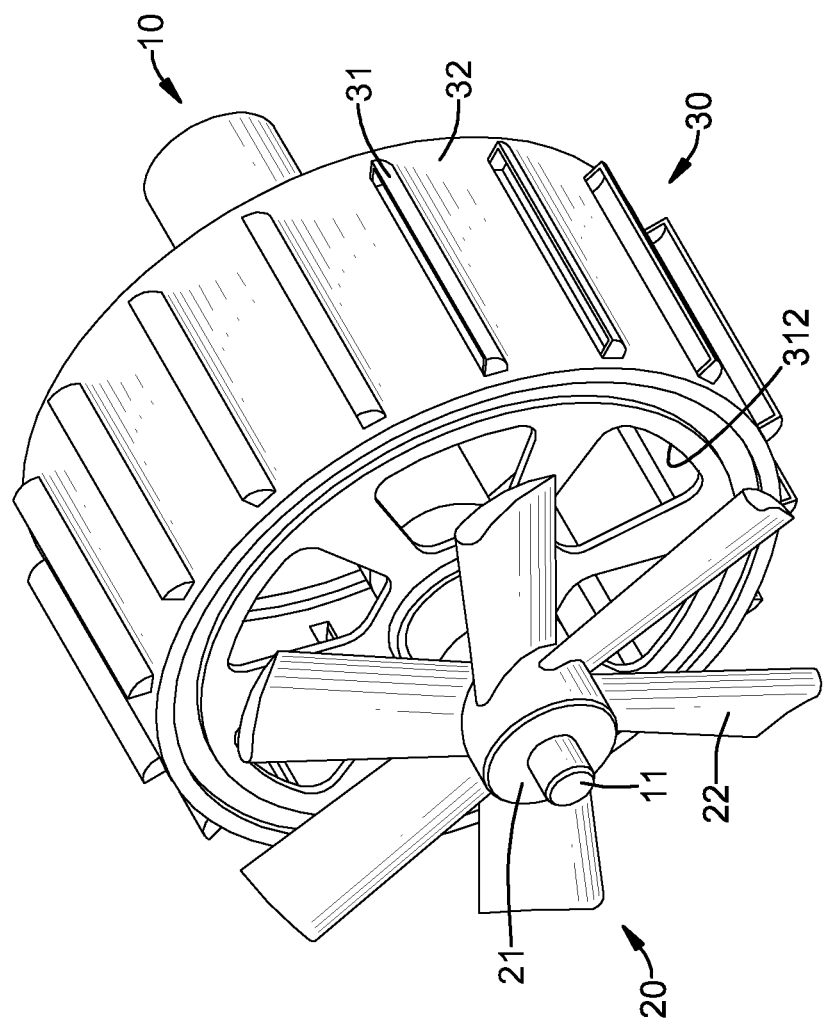
FIG. 11 is a perspective view of a fifth embodiment of a wind turbine in accordance with the present invention.

The at least two second blades 32 are mounted on and protrude from the external surface of the casing 31. Preferably, with reference to FIGS. 1 and 11, the second fan device 30 has multiple second blades 32 mounted on and protruding from the external surface of the casing 31 at intervals. The holding ring 33 is mounted around the spindle 10 in the second pivot hole 311 of the casing 11 to hold the casing 31 on the spindle 10 and abuts with the insulating ring 23 of the first fan device 20. Then, the casing 31 of the second fan device 30 is held on the spindle 10 between the insulating ring 23 and the holding ring 33.

Figure 4:
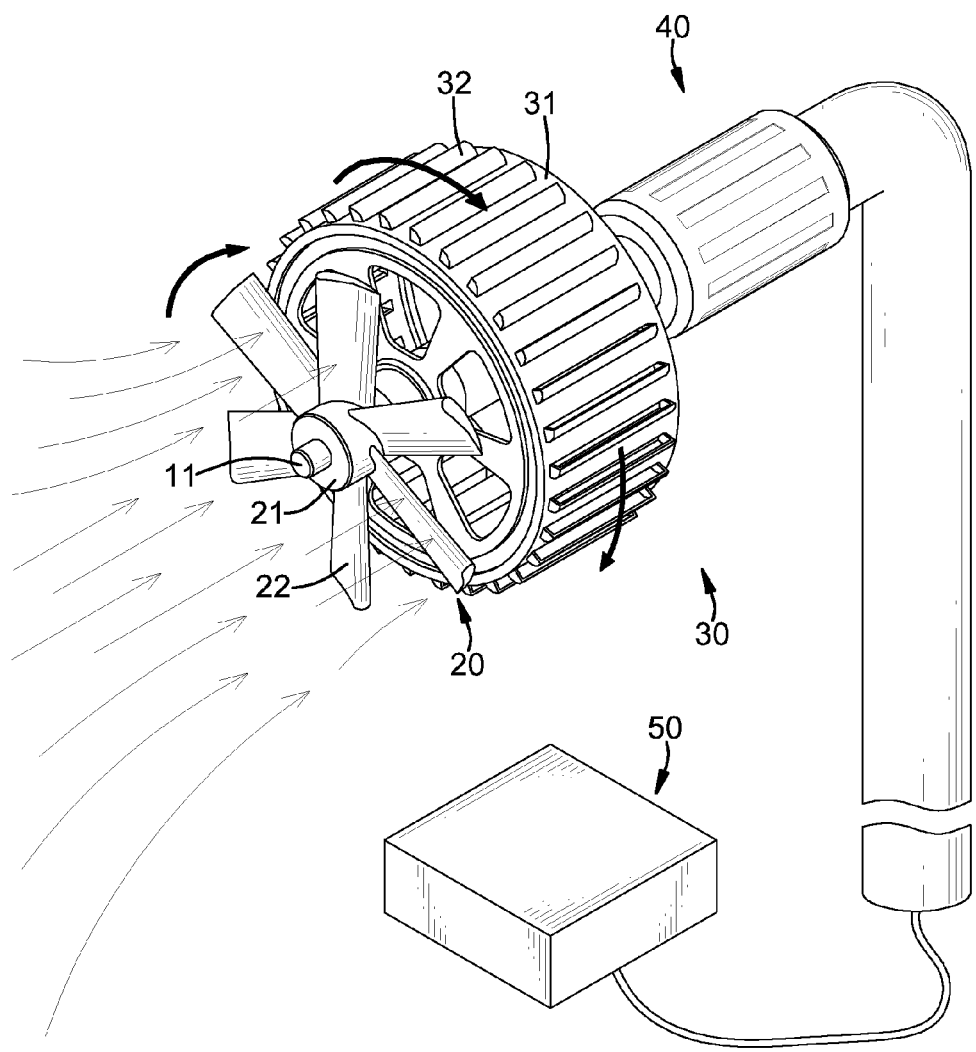
FIG. 4 is an operational perspective view of the wind turbine in FIG. 3 in strong wind.
Figure 5:
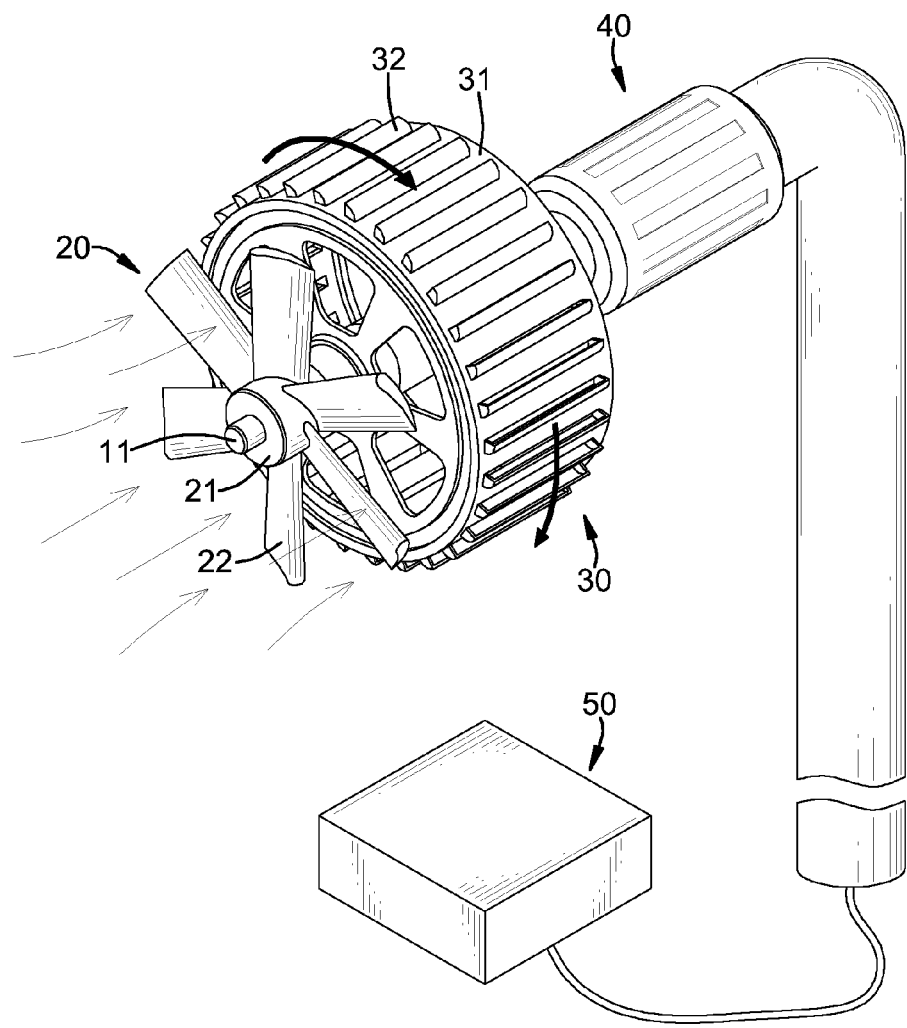
FIG. 5 is an operational perspective view of the wind turbine in FIG. 3 in a calm wind.

With reference to FIGS. 4 and 5, the generator 40 is electrically connected to a capacitor 50 to store the electric power generated by the generator 40 when the wind turbine is rotated by wind.

In use, with further reference to FIG. 4, when the first embodiment of the wind turbine in accordance with the present invention is used in a strong wind, the at least two first blades 22 of the first fan device 20 can be rotated by the strong wind to rotate the spindle 10 with the body 21. In addition, the at least two second blades 32 of the second fan device 30 also can be rotated by the strong wind to rotate the spindle 10 with the casing 31. Therefore, the blades 21, 32 of the fan devices 20, 30 can be rotated by the strong wind at the same time to rotate the spindle 10 in the strong wind condition. Then, the generator 40 can generate electric power by the operation of the wind turbine in accordance with the present invention and the capacitor 50 can store the electric power.

In addition, the area that facing the wind of the at least two first blades 22 are larger than that of the at least two second blades 32. With further reference to FIG. 5, when the first embodiment of the wind turbine in accordance with the present invention is used in a gentle wind condition, the at least two first blades 22 of the first fan device 20 in the larger dimension may be kept stationary with the gentle wind but the at least two second blades 32 of the second fan device 30 in the smaller dimension can be rotated by the gentle wind. Therefore, the spindle 10 can be rotated by the at least two second blades 32 of the second fan device 30 to make the generator 40 generating electric power in the gentle wind condition.

Figure 6:
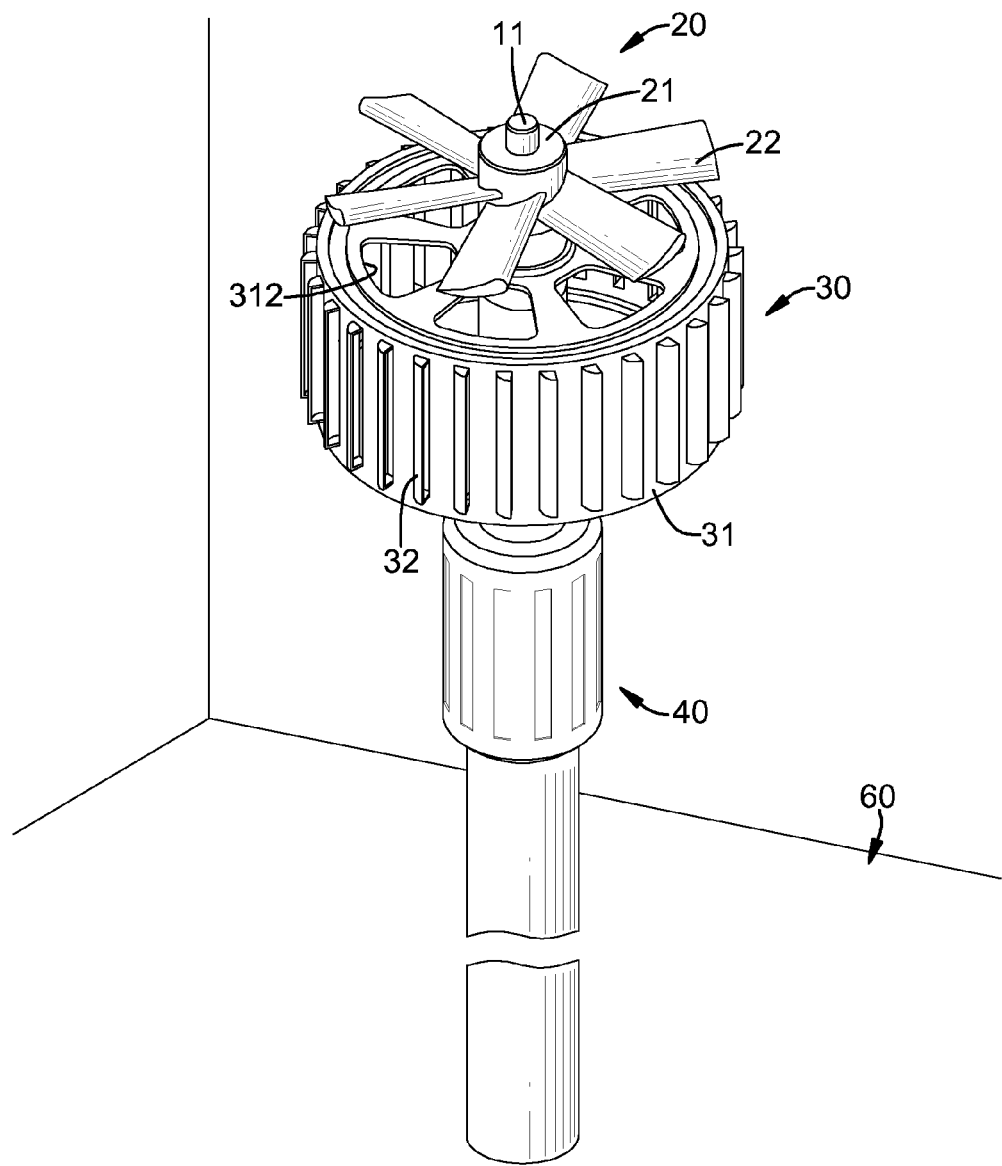
FIG. 6 is a further perspective view of the wind turbine in FIG. 3 perpendicular to the ground.
Figure 7:
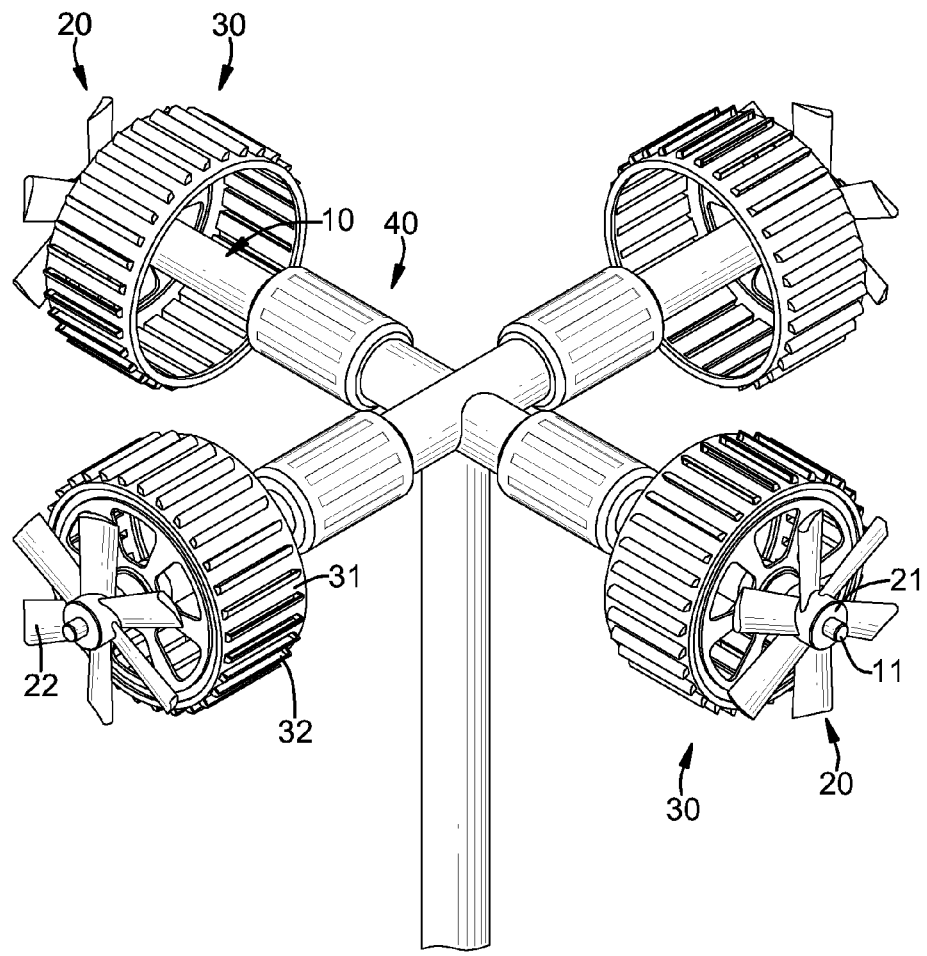
FIG. 7 is a further operational perspective view of the wind turbine in FIG. 3 connected with other fan assemblies.
Figure 8:
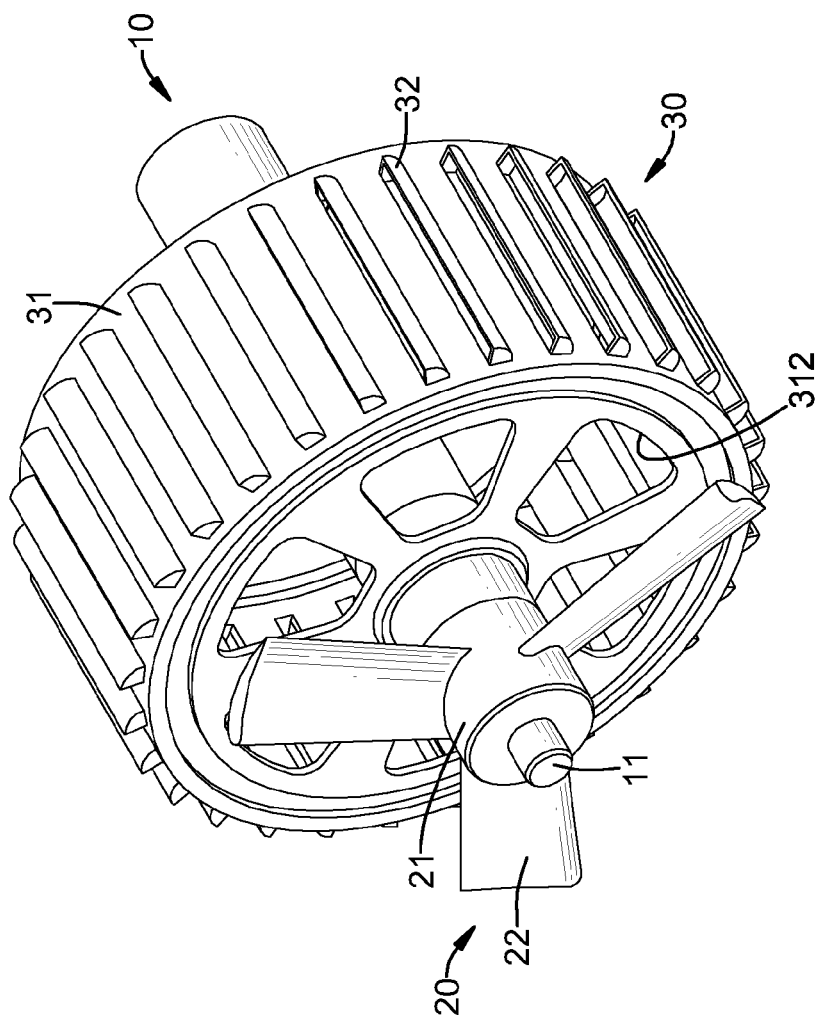
FIG. 8 is a perspective view of a second embodiment of a wind turbine in accordance with the present invention.
Figure 9:
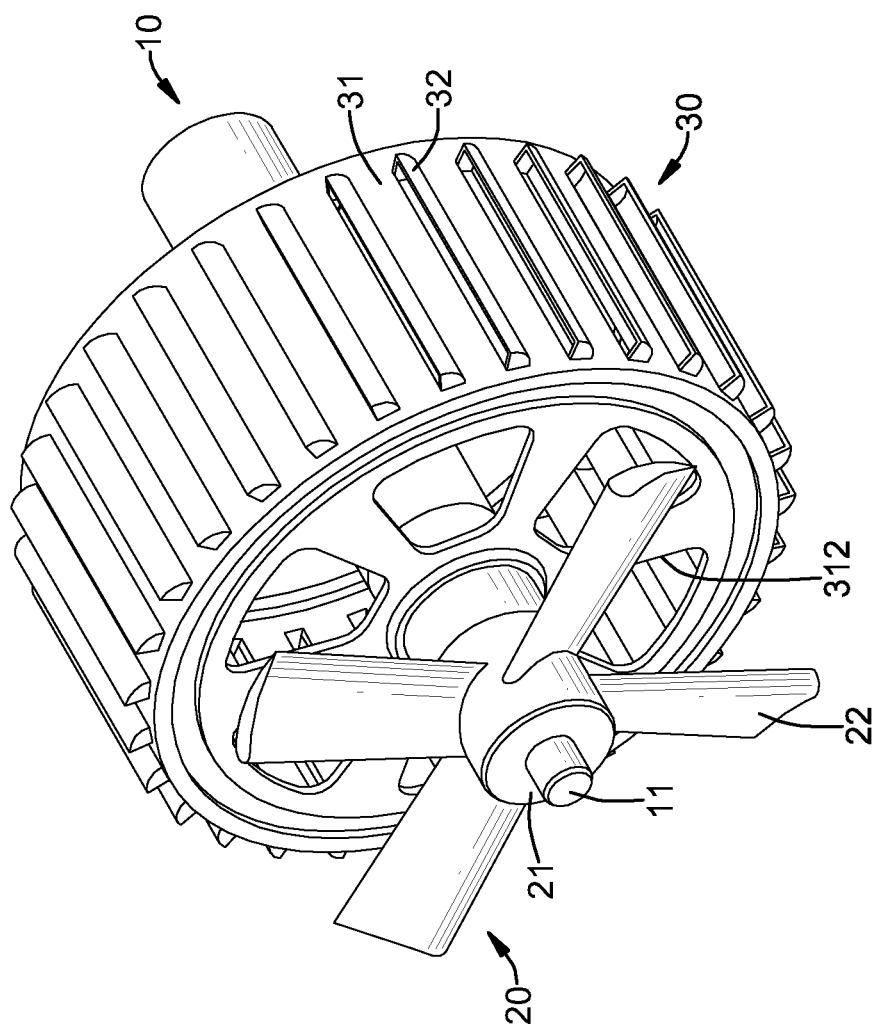
FIG. 9 is a perspective view of a third embodiment of a wind turbine in accordance with the present invention.
Figure 10:
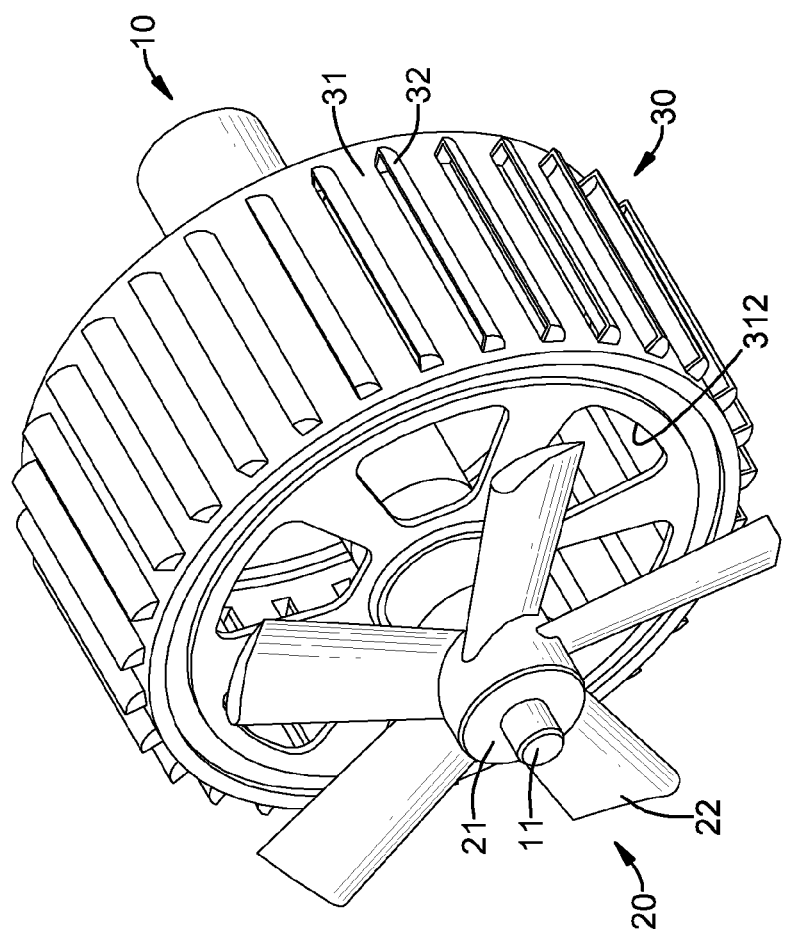
FIG. 10 is a perspective view of a fourth embodiment of a wind turbine in accordance with the present invention.

Furthermore, with reference to FIG. 6, the spindle 10 of the wind turbine in accordance with the present invention can be set perpendicular to the ground 60 by arrange a shaft of the generator 40 that aligns with the spindle 10 vertical to the ground 60. In addition, multiple fan assemblies can be connected to each other as shown in FIG. 7 to receive different directions of the wind power. In addition, the wind turbine in accordance with the present invention can be adjusted upward or downward by the spindle 10 connected to a lifting device such as a lead screw device. Furthermore, the wind turbine in accordance with the present invention also can be set on the water surface by an anchor connected to the spindle 10.

The wind turbine as described has the following advantages.

1. In the strong wind condition, the blades 22, 32 of the fan devices 20, 30 of the wind turbine in accordance with the present invention can be simultaneously rotated to rotate the spindle 10 so as to generate electric power by the generator 40.
2. Although the at least two first blades 22 of the first fan device 20 may be kept stationary in the gentle wind condition, the at least two second blades 32 of the second fan device 30 still can be rotated to rotate the spindle 10 and to generate electric power by the generator 40. Then, the wind turbine in accordance with the present invention can be used to generate electric power in all conditions of the wind power.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A wind turbine having
    a spindle;
    a first fan device rotatably mounted around the spindle and having
        a center;
        an external surface;
        a first pivot hole formed through the center of the first fan device and mounted around the spindle; and
        at least two first blades radially mounted on and protruding from the external surface of the first fan device; and
    a second fan device rotatably mounted around the spindle and having
        a center;
        an external surface;
        a second pivot hole formed through the center of the second fan device and mounted around the spindle;
        multiple through holes formed through the second fan device around the second pivot hole at intervals; and
        at least two second blades mounted on and protruding from the external surface of the second fan device.

2. The wind turbine as claimed in claim 1, wherein
    the first fan device has an insulating ring mounted around the spindle;
    the second fan device has a holding ring mounted around the spindle in the second pivot hole to hold the second fan device on the spindle and the holding ring abutting with the insulating ring of the first fan device; and
    wherein the second fan device is held on the spindle between the insulating ring and the holding ring.

3. The wind turbine as claimed in claim 2, wherein the spindle has
    a front end; and
    a limiting cover securely mounted around the front end of the spindle to hold the first fan device with the spindle.

4. The wind turbine as claimed in claim 3, wherein the second fan device has multiple second blades mounted on and protruding from the external surface of the second fan device at intervals.

5. The wind turbine as claimed in claim 4, wherein the first fan device has three first blades radially mounted on and protruding from the external surface of the first fan device at intervals.

6. The wind turbine as claimed in claim 4, wherein the first fan device has four first blades radially mounted on and protruding from the external surface of the first fan device at intervals.

7. The wind turbine as claimed in claim 4, wherein the first fan device has five first blades radially mounted on and protruding from the external surface of the first fan device at intervals.

8. The wind turbine as claimed in claim 1, wherein the spindle has
    a front end; and
    a limiting cover securely mounted around the front end of the spindle to hold the first fan device with the spindle.

9. The wind turbine as claimed in claim 1, wherein the second fan device has multiple second blades mounted on and protruding from the external surface of the second fan device at intervals.

10. The wind turbine as claimed in claim 1, wherein the first fan device has three first blades radially mounted on and protruding from the external surface of the first fan device at intervals.

11. The wind turbine as claimed in claim 1, wherein the first fan device has four first blades radially mounted on and protruding from the external surface of the first fan device at intervals.

12. The wind turbine as claimed in claim 1, wherein the first fan device has five first blades radially mounted on and protruding from the external surface of the first fan device at intervals.

* * * * *